US 9,307,165 B2

(12) United States Patent
Levy (10) Patent No.: US 9,307,165 B2
(45) Date of Patent: Apr. 5, 2016

(54) IN-CAMERA PANORAMA IMAGE STITCHING ASSISTANCE

(75) Inventor: Noam Levy, Karmiel (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 1272 days.

(21) Appl. No.: 12/536,728

(22) Filed: Aug. 6, 2009

(65) Prior Publication Data
US 2010/0033553 A1 Feb. 11, 2010

Related U.S. Application Data

(60) Provisional application No. 61/087,257, filed on Aug. 8, 2008.

(51) Int. Cl.
*H04N 7/00* (2011.01)
*H04N 5/262* (2006.01)
*G06T 7/00* (2006.01)
(Continued)

(52) U.S. Cl.
CPC .............. *H04N 5/2624* (2013.01); *G03B 37/02* (2013.01); *G03B 37/04* (2013.01); *G06K 9/20* (2013.01); *G06T 3/0062* (2013.01); *G06T 3/4038* (2013.01); *G06T 7/0079* (2013.01); *H04N 5/23238* (2013.01); *H04N 5/3415* (2013.01); *G06K 2009/2045* (2013.01)

(58) Field of Classification Search
CPC ............ H04N 5/23238; H04N 5/3415; H04N 2013/0088; G06T 3/0062; G06T 3/4038; G06T 7/0079; G03B 37/02; G03B 37/04
USPC .......................................................... 348/36
See application file for complete search history.

(56) References Cited

U.S. PATENT DOCUMENTS 6,002,430 A * 12/1999 McCall et al. ........... 348/207.99
6,023,588 A 2/2000 Ray et al.
(Continued)

FOREIGN PATENT DOCUMENTS

EP  2242252 A2  10/2010
WO  2008004150 A2  1/2008

OTHER PUBLICATIONS

Fischler, Martin A. and Bolles, Robert C., Random Sample Consensus: A Paradigm for Model Fitting with Applications to Image Analysis and Automated Cartography, Communications of the ACM, vol. 24 No. 6, Jun. 1981, pp. 381-395.
(Continued)

*Primary Examiner* — Blake Rubin
(74) *Attorney, Agent, or Firm* — Knobbe, Martens, Olson & Bear, LLP (57) ABSTRACT

A camera that provides for a panorama mode of operation that stitches together two or more images to create a single image with a wide format. In panorama mode, a live view of a scene is transformed from rectangular coordinates to cylindrical coordinates and displayed by the camera. Also, an overlap portion between the previous image and the next image to be captured is characterized. In real time, after the previous image is captured, the overlap portion of the previous image is also transformed from rectangular coordinates into cylindrical coordinates. Next, the camera displays an overlay of at least a portion of the overlap portion onto the live view of the next image to be captured. And this overlay can assist the user in aligning the live view of the next image to be captured with the overlap portion of the previously captured image.

20 Claims, 6 Drawing Sheets

(51) Int. Cl.

| | | |
|---|---|---|
| *G03B 37/02* | (2006.01) | |
| *G06T 3/00* | (2006.01) | |
| *H04N 5/341* | (2011.01) | |
| *G03B 37/04* | (2006.01) | |
| *G06K 9/20* | (2006.01) | |
| *G06T 3/40* | (2006.01) | |
| *H04N 5/232* | (2006.01) | |

(56) References Cited

U.S. PATENT DOCUMENTS

| | | | |
|---|---|---|---|
| 6,075,905 A | 6/2000 | Herman et al. | |
| 6,252,603 B1 * | 6/2001 | Oxaal | 345/427 |
| 6,331,869 B1 * | 12/2001 | Furlan et al. | 348/36 |
| 6,671,400 B1 * | 12/2003 | Ekpar et al. | 382/157 |
| 6,677,981 B1 | 1/2004 | Mancuso et al. | |
| 6,717,608 B1 | 4/2004 | Mancuso et al. | |
| 6,731,305 B1 | 5/2004 | Park et al. | |
| 6,771,304 B1 | 8/2004 | Mancuso et al. | |
| 6,785,427 B1 | 8/2004 | Zhou | |
| 6,834,128 B1 * | 12/2004 | Altunbasak et al. | 382/284 |
| 6,885,392 B1 | 4/2005 | Mancuso et al. | |
| 6,930,703 B1 | 8/2005 | Hubel et al. | |
| 7,064,783 B2 | 6/2006 | Colavin et al. | |
| 7,197,192 B2 | 3/2007 | Edwards | |
| 7,289,147 B2 | 10/2007 | Webb | |
| 7,373,017 B2 | 5/2008 | Edwards et al. | |
| 7,375,745 B2 | 5/2008 | Rai et al. | |
| 7,424,218 B2 | 9/2008 | Baudisch et al. | |
| 7,460,730 B2 | 12/2008 | Pal et al. | |
| 7,480,001 B2 * | 1/2009 | Endler et al. | 348/333.01 |
| 7,639,897 B2 | 12/2009 | Gennetten et al. | |
| 7,656,429 B2 * | 2/2010 | Larson | 348/208.14 |
| 7,711,262 B2 * | 5/2010 | Park et al. | 396/296 |
| 7,746,375 B2 | 6/2010 | Ketelaars et al. | |
| 7,746,404 B2 | 6/2010 | Deng et al. | |
| 7,860,343 B2 | 12/2010 | Tico et al. | |
| 7,965,332 B2 * | 6/2011 | Chiu et al. | 348/333.12 |
| 8,279,288 B2 * | 10/2012 | Son et al. | 348/208.1 |
| 8,350,892 B2 | 1/2013 | Hayashi | |
| 2001/0010555 A1 * | 8/2001 | Driscoll, Jr. | 348/335 |
| 2001/0030693 A1 | 10/2001 | Fisher et al. | |
| 2003/0063816 A1 * | 4/2003 | Chen et al. | 382/284 |
| 2003/0103683 A1 | 6/2003 | Horie | |
| 2004/0027451 A1 * | 2/2004 | Baker | 348/46 |
| 2004/0189849 A1 | 9/2004 | Hofer | |
| 2004/0201755 A1 | 10/2004 | Norskog | |
| 2005/0089244 A1 | 4/2005 | Jin et al. | |
| 2005/0168594 A1 * | 8/2005 | Larson | 348/222.1 |
| 2006/0050152 A1 | 3/2006 | Rai et al. | |
| 2006/0072176 A1 * | 4/2006 | Silverstein et al. | 358/540 |
| 2006/0182437 A1 * | 8/2006 | Williams et al. | 396/429 |
| 2006/0187305 A1 * | 8/2006 | Trivedi et al. | 348/169 |
| 2007/0025723 A1 * | 2/2007 | Baudisch et al. | 396/287 |
| 2007/0031062 A1 | 2/2007 | Pal et al. | |
| 2007/0081081 A1 * | 4/2007 | Cheng | 348/218.1 |
| 2007/0109398 A1 | 5/2007 | Teo | |
| 2007/0206945 A1 * | 9/2007 | DeLorme et al. | 396/332 |
| 2007/0237423 A1 | 10/2007 | Tico et al. | |
| 2008/0043093 A1 | 2/2008 | Song | |
| 2008/0056612 A1 | 3/2008 | Park et al. | |
| 2008/0062254 A1 | 3/2008 | Edwards et al. | |
| 2008/0074489 A1 | 3/2008 | Zhang et al. | |
| 2008/0074506 A1 | 3/2008 | Oh et al. | |
| 2008/0158342 A1 | 7/2008 | Jeong et al. | |
| 2008/0159653 A1 * | 7/2008 | Dunki-Jacobs et al. | 382/293 |
| 2008/0170803 A1 * | 7/2008 | Forutanpour | 382/284 |
| 2008/0291288 A1 | 11/2008 | Tzur et al. | |
| 2009/0028462 A1 | 1/2009 | Habuka et al. | |
| 2009/0058988 A1 * | 3/2009 | Strzempko et al. | 348/36 |
| 2009/0208062 A1 | 8/2009 | Sorek et al. | |
| 2010/0020190 A1 | 1/2010 | Kawakatsu et al. | |
| 2010/0033553 A1 | 2/2010 | Levy | |
| 2010/0054628 A1 | 3/2010 | Levy et al. | |
| 2010/0265313 A1 | 10/2010 | Liu et al. | |
| 2012/0177253 A1 | 7/2012 | Tseng et al. | |
| 2013/0038680 A1 | 2/2013 | Mashiah | |
| 2013/0124951 A1 | 5/2013 | Shechtman et al. | |
| 2014/0085533 A1 * | 3/2014 | Celia | 348/369 |

OTHER PUBLICATIONS

Ha, Seong Jong et al., *Panorama Mosaic Optimization for Mobile Camera Systems*, IEEE Transactions on Consumer Electronics, vol. 53 issue 4, Nov. 2007, pp. 1217-1225.

Milgram, David L., *Adaptive Techniques for Photomosaicking*, IEEE Transactions on Computers vol. C-26 issue 11, Nov. 1977, pp. 1175-1180.

Milgram, David L., *Computer Methods for Creating Photomosaics*, IEEE Transactions on Computers vol. C-24 issue 11, Nov. 1975, pp. 1113-1119.

International Search Report and Written Opinion for International Patent Application No. PCT/US2009/055265 mailed Oct. 15, 2009.

U.S. Appl. No. 12/549,254, filed Aug. 27, 2009; Inventors: Noam Levy et al.

International Searching Authority; International Search Report & Written Opinion dated Sep. 18, 2009 for PCT/US2009/053151, 7 pages.

Search Report for British Patent Application No. GB1205402.9 dated Jul. 24, 2012.

Official Communication for U.S. Appl. No. 12/549,254 mailed Oct. 19, 2012.

Official Communication for U.S. Appl. No. 12/549,254 mailed Mar. 4, 2013.

Official Communication for U.S. Appl. No. 12/549,254, mailed Jun. 10, 2013.

* cited by examiner

IN-CAMERA PANORAMA IMAGE STITCHING ASSISTANCE

CROSS-REFERENCE TO RELATED APPLICATIONS

This utility application is based upon U.S. Provisional Patent Application No. 61/087,257, filed on Aug. 8, 2008, the benefit of which is hereby claimed under 35 U.S.C. §119(e) and incorporated herein by reference.

FIELD OF THE INVENTION

The invention is related to digital cameras, and in particular but not exclusively, to a method and device for assisting in the alignment of individual images for a panoramic view.

BACKGROUND OF THE INVENTION

Panoramic photography often employs specialized cameras, equipment and/or software, to capture a sequence of images that are reconstructed into a single image that takes the form of a wide strip with an elongated field of view. Panoramic photography is sometimes known as wide format photography. Typically, a panoramic image shows a field of view that is greater than that of a film camera equipped with a wide angle lens. And a typical film camera equipped with a wide angle lens can generally capture an image with a field of view that covers about 90 degrees across the diagonal of the captured image, e.g., a 35 millimeter film camera with a 22 degree lens can capture such an image. One way to capture a panoramic image is to mount a film camera on a tripod and as the camera is rotated, a succession of images of a scene are taken that are subsequently stitched together by physically cutting and pasting together strips of exposed film where the boundaries between the edges of the film are carefully aligned. In some cases, a wider than usual strip of film can be used with a film camera that employs special movable or stereo optics. In other film cameras, conventional format film, such as 35 millimeter, can be masked during the exposure in the camera to provide a wide aspect or panoramic effect.

Recently, the benefits of electronic photography have led to the wide acceptance of digital cameras, which, unlike their film-based counterparts, store captured images in a digital memory such as flash memory. And some digital cameras can also provide a "panorama" feature, which allows a user of the digital camera to capture a sequence of adjacent images that are subsequently "stitched" together into a single image with a wide coverage of field. For example, some digital cameras can interface with a personal computer that provides software to join together two or more images at their edge boundaries to generate a single image with a wide panoramic format.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items being connected, or an indirect connection through one or more passive or active intermediary devices.

Briefly stated, embodiments of the invention are related to a camera that provides for a panorama mode of operation that stitches together two or more images to create a single image with a wide format. In panorama mode, a live view of a scene is transformed from rectangular coordinates to cylindrical coordinates and displayed by the camera. This transformation can be accomplished with a look-up table in which values that are not in the look-up table can be determined by interpolation hardware within the camera. Also, an overlap portion between a previously captured image and the next image to be captured is characterized. In real time, after the previous image is captured, the overlap portion of the previous image is also transformed from rectangular coordinates into cylindrical coordinates. Next, the camera displays an overlay of at least a portion of the overlap portion onto the live view of the next image to be captured. And this overlay can assist the user in aligning the live view of the next image to be captured with the overlap portion of the previously captured image.

Figure 1:
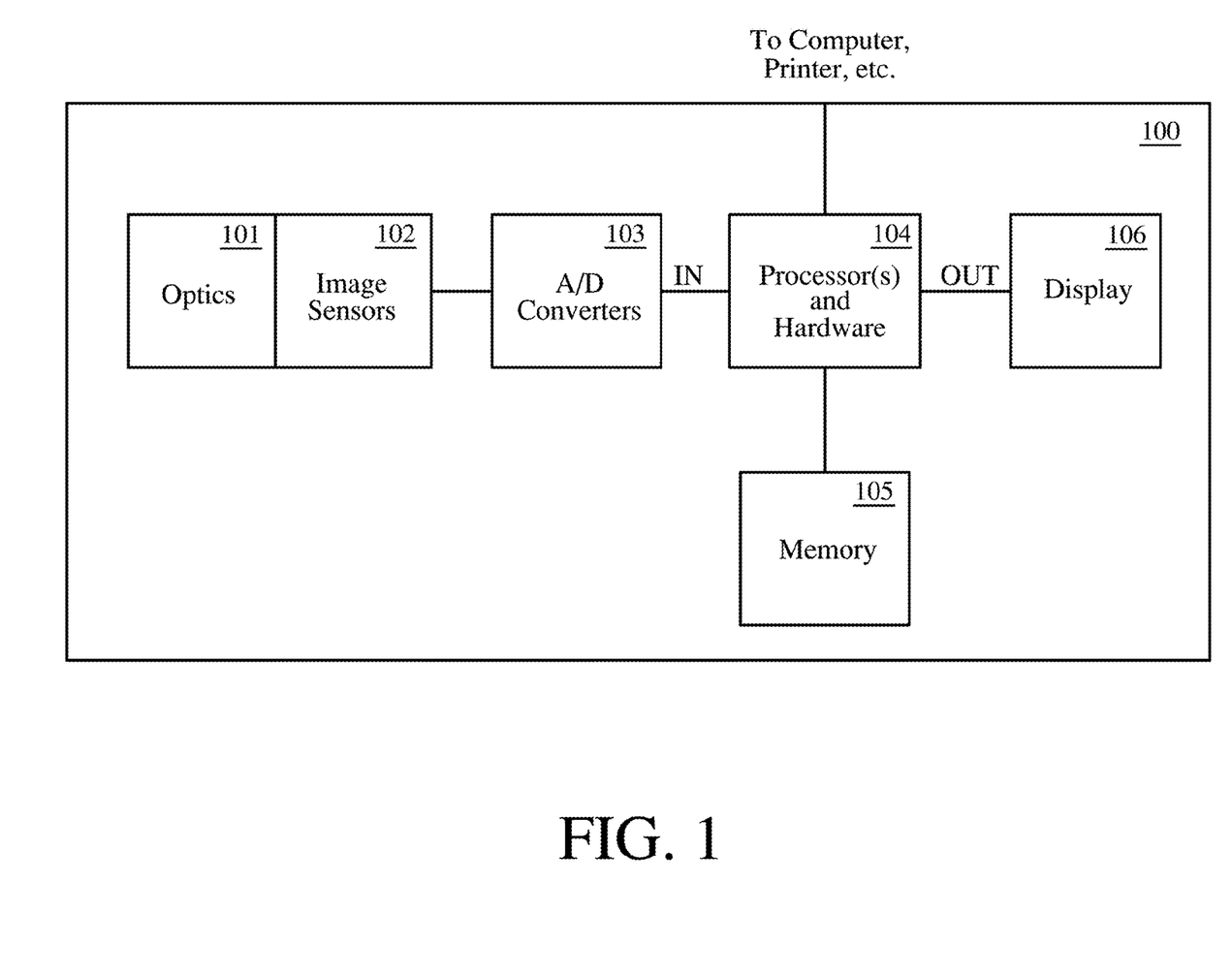
FIG. 1 shows a block diagram of an embodiment of a digital camera.

FIG. 1 shows a block diagram of an embodiment of digital camera 100. Digital camera 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors and hardware 104 coupled to receive the outputs of the A/D converters 103. The image sensors 102 may produce separate R, G and B color signals. Camera 100 further includes a display device 106 coupled to outputs of the processor(s) and hardware 104, and a memory 105 having bi-directional communication with the processor(s) 104.

In operation, the image sensors 102 receive input light through the optics 101 and, in response, produce analog output color signals R, G and B to the A/D converters. The A/D converters convert those input color signals to digital form, which are provided to the processor(s) 104.

Figure 4:
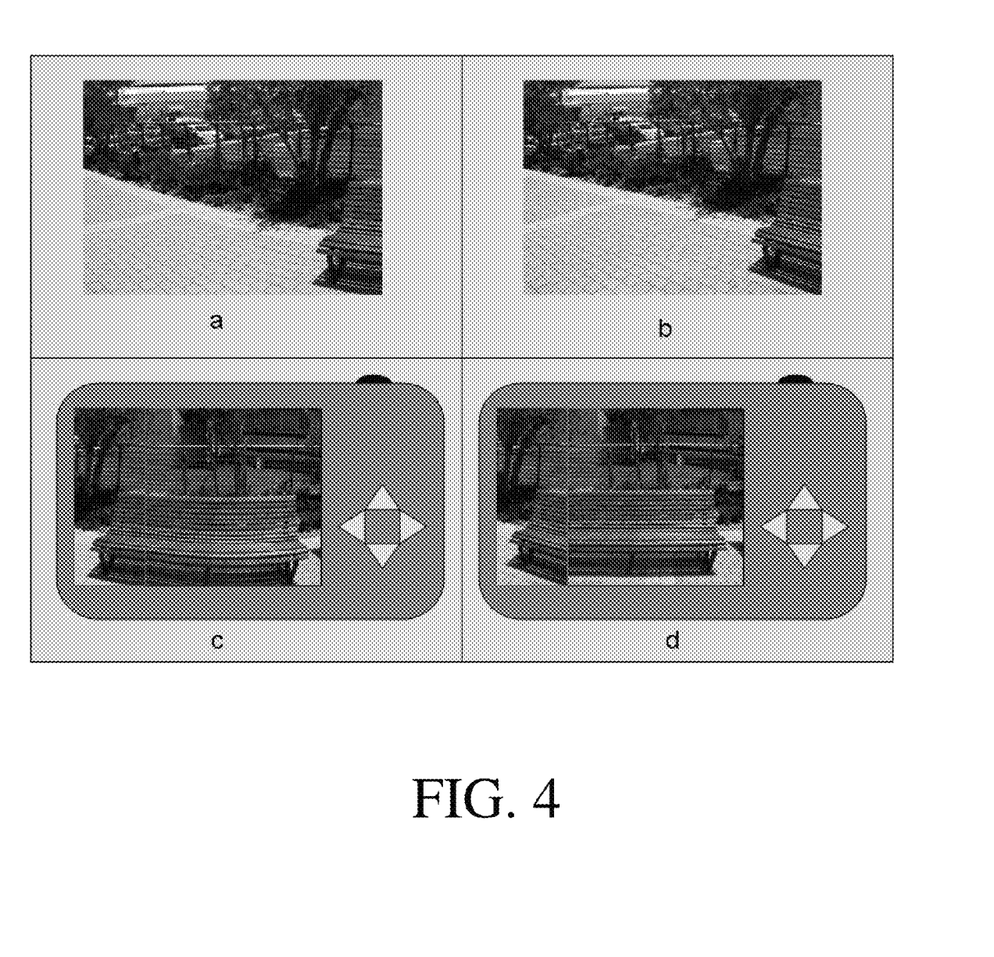
FIGS. 4a-d illustrate various camera images for illustrative purposes.
Figure 5:
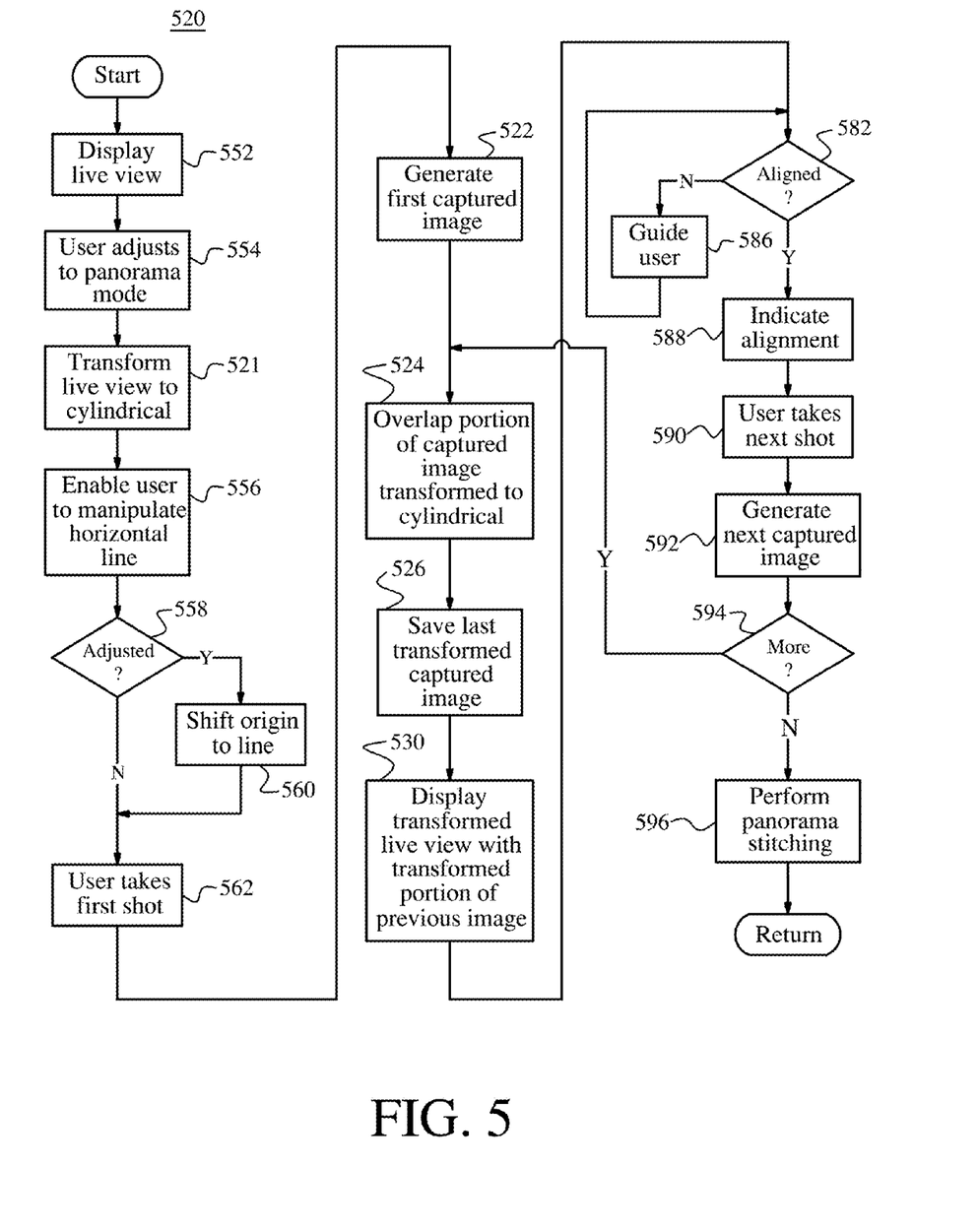
FIG. 5 shows a flow chart of an embodiment of the process of FIG. 3.

The processor(s) and hardware 104 may include a CPU as well as specialized hardware, as discussed in greater detail below. Processor(s) 104 may perform any of various well-known types of processing on those input color signals. The processor(s) 104 may be or include, for example, any one or more of: a programmed microprocessor or digital signal processor (DSP), a microcontroller, an application specific integrated circuit (ASIC), a programmable logic device (PLD), etc. Processor(s) and hardware 104 may perform various processes, such as the process illustrated in FIGS. 4 and/or 5.

The memory 105 may be or include, for example, anyone or more of: flash memory, read-only memory, random access memory (RAM), etc.

Processed or raw color data can be output to the display device 106 for display and/or to one or more external devices, such as a computer or printer.

Figure 2:
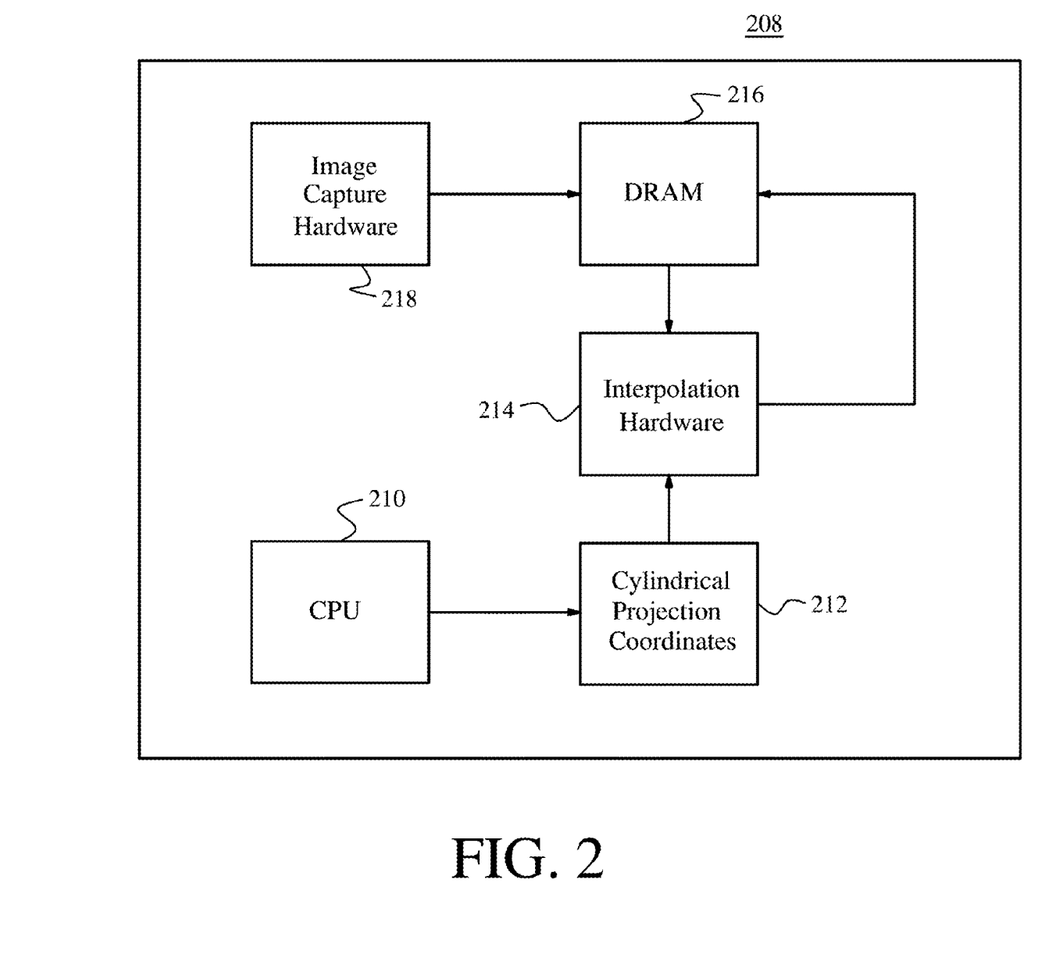
FIG. 2 illustrates a block diagram of an embodiment of a device that may be included as an embodiment of the digital camera of FIG. 1.

FIG. 2 illustrates a functional block diagram of an embodiment of device 208. Device 208 may be employed as an embodiment of a portion of processor(s) and hardware 104 and memory 105 of FIG. 1. Device 208 includes central processing unit (CPU) 210, cylindrical projection coordinates 212, interpolation hardware 214, dynamic random access memory (DRAM) 216, and image capture hardware 218.

CPU 210 is arranged to prepare a sparse grid look-up table of the rectangular coordinate to cylindrical coordinate transformation function. This transformation is a cylindrical projection used for rendering a horizontal panorama. The image is projected onto the face of an imaginary cylinder, the camera being at the center, and uses the assumption that the camera rotates approximately about the axes of symmetry of the cylinder.

Mathematically, the image coordinates in the warped image ($\phi$, h) are related to the image coordinates in the original image by the following relation:

$$x = f \cdot \tan(\phi) \quad y = f \cdot h \cdot \sec(\phi),$$

where f is the focal length of the camera (e.g., digital camera 100 of FIG. 1).

Device 208 is arranged to warp the image in real time. The transformation is calculated by keeping a look-up table (LUT) containing samples of the tangent and secant functions. Values are interpolated out of these tables. In one embodiment, a table containing 128 samples is enough to transform the image with visually unnoticeable deviation relative to the same image as transformed using the precisely evaluated functions at each pixel location. This method is suitable for fixed point calculations and does not require an FPU (floating point unit).

In some embodiments, the inputs to the sparse grid look-up table are the cylindrical coordinates, and the outputs are the corresponding rectangular coordinates. For each cylindrical coordinate in the output cylindrical coordinate image that is being generated, the table (and interpolation) is used to determine the corresponding rectangular coordinate value in the rectangular coordinate input value. The pixel value at that rectangular coordinate is then used as the pixel value at the corresponding cylindrical coordinate in the output image.

CPU 210 uses the sparse grid in tandem with the specialized hardware flow shown in FIG. 2. Interpolation hardware unit 214 reads the sparse grid. In one embodiment, interpolation hardware unit 214 is specialized hardware arranged to perform interpolation, such as bi-linear interpolation. Cylindrical coordinates 212 are input to the sparse grid, with rectangular outputs determined from the sparse grid. The sparse grid only contains a portion of the coordinates. Interpolation hardware unit 214 determines the remaining coordinates using interpolation based on the values that are contained in the sparse grid. Image capture hardware 218 provides the captured image, which is stored on DRAM 216 and creates a transformed image based on the coordinates determined by interpolation hardware 214. The transformed image is written back to DRAM 216.

Figure 3:
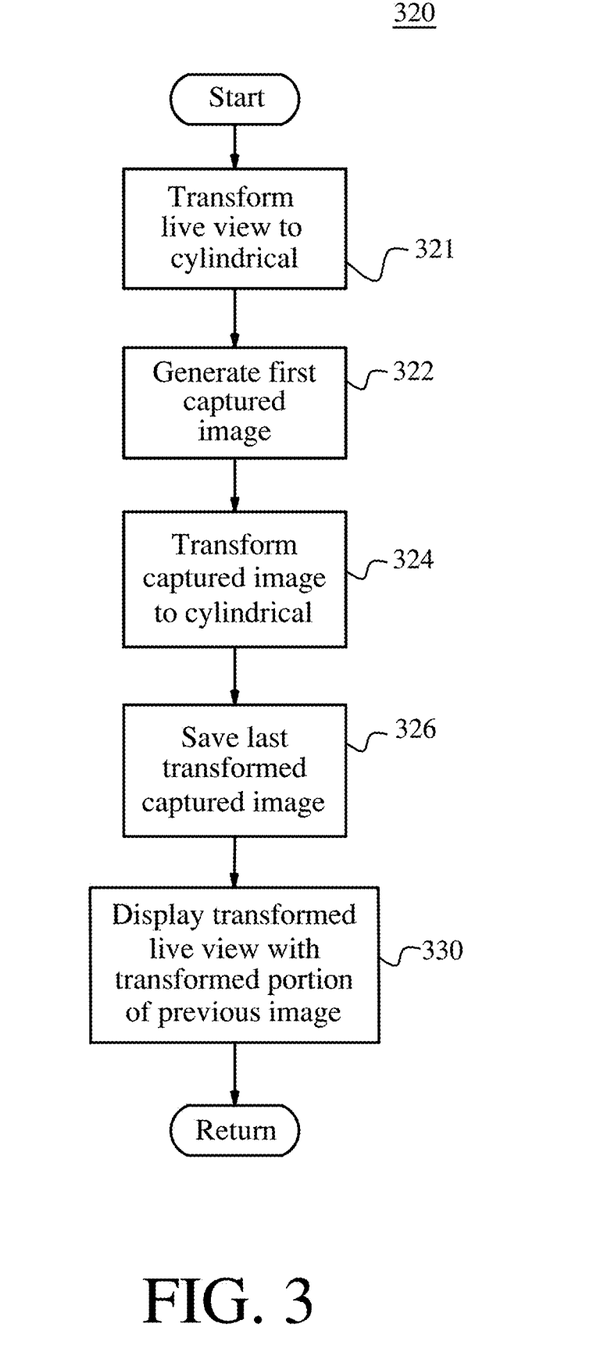
FIG. 3 shows a flow chart of an embodiment of a process of panorama stitching assistance.

FIG. 3 shows a flow chart of an embodiment of a process (320) of panorama stitching assistance. Various embodiment of process 320 may include more or less steps than illustrated in FIG. 3. After a start block, the process proceeds to block 321, where the live view of the camera (e.g. digital camera 100 of FIG. 1) is transformed from rectangular coordinates to cylindrical coordinates, in the manner discussed above with regard to FIG. 2. The "live view" may be interchangeably referred to as a "real-time view". As discussed, a sparse grid look-up table is used to generate rectangular coordinates from the cylindrical coordinates, and interpolation is used to generate the coordinates not stored in the sparse grid look-up table.

The process then proceeds to block 322, where a first image is captured based on a first shot taken from a camera (e.g. digital camera 100 of FIG. 1). In one embodiment, the image capturing is performed by image capture hardware 218 of FIG. 2. The process then advances to block 324, where part or all of the captured image (in reduced resolution) is transformed to cylindrical coordinates, in the manner discussed above.

The process then moves to block 326, where the transformed, first captured image (or a portion of the first image) is saved. As with the live camera view, before saving, the first captured image is transformed into cylindrical coordinates. In one embodiment, it is saved in DRAM 216 of FIG. 2.

The process then proceeds to block 330, where, on the display of the camera (e.g. display 106 of FIG. 1) is simultaneously displayed the portion of the image saved at block 326 and the transformed live view. The portion of the image saved at block 326 is displayed adjacently to the live view. This facilitates alignment of the live view of the camera with the saved first image, so that a second image may be captured for creating a panorama of at least the first image and the second image. The process then advances to a return block, where other processing is performed.

FIGS. 4*a-d* illustrate various camera images for illustrative purposes. FIG. 4*b* shows an embodiment of a first rectangular coordinate image. This may be, for example, the first captured image generated in step 322 of FIG. 3, prior to translation into cylindrical coordinates. FIG. 4*a* illustrates an embodiment of the image of FIG. 4*a* transformed into cylindrical coordinates. FIG. 4*c* illustrates an example of the display from block 330. On the left is a saved portion of the image of FIG. 4*a*, taking up about the left 20% of the screen. To the right of this image, taking up about 80% of the screen, is the live view of the camera, transformed into cylindrical coordinates. The display illustrates in FIG. 4*c* facilitates alignment of the live view of the camera with the previous image. This is contrasted with FIG. 4*d*, which illustrates how the view of FIG. 4*c* would look if cylindrical projection was not performed, which would hamper the ease in aligning the images.

FIG. 5 shows a flow chart of an embodiment of process 520, which is an embodiment of process 320 of FIG. 3. After a start block, the process proceeds to block 552, where a live view is displayed on the screen of the camera. The process then moves to block 554, where the user adjusts the camera to panorama mode. The camera is capable of operating in both normal mode and panorama mode. In panorama mode, the user takes multiple images, with assistance from the camera for alignment of the image, to eventually be stitched together to form a panoramic image. In normal mode, individual images are taken and are not combined. Additionally, the user indicates the kind of panorama: left to right, right to left, top to bottom, bottom to top.

The process then proceeds to block 521, where the live view of the camera (e.g. digital camera 100 of FIG. 1) is transformed from rectangular coordinate to cylindrical coordinates, in the manner discussed above with regard to FIG. 2. In this step, the rectangular image is "warped", that is, cylindrically projected by a transformation from rectangular coordinates to cylindrical coordinates. As discussed, a sparse grid look-up table is used to generate rectangular coordinates from the cylindrical coordinates, and interpolation is used to generate the coordinates not stored in the sparse grid look-up table.

The process then proceeds to block 556, where the camera enables the user to manipulate a horizontal line displayed on the screen. This line determines the line of the horizon based on user input, determining how the the final panorama will look (since, in a cylindrical projection, only one horizontal line can be kept straight.) The camera enables the user to manipulate the horizontal line using the camera controls.

The process then advances to decision block 558, where a determination is made as to whether the user adjusted the horizontal line. If the user did not adjust the horizontal line, the process proceeds to block 562. Conversely, if the user did adjust the horizontal line, the process moves to block 560, where the cylindrical projection origin is shifted to the new position of the horizontal line. The adjustment is made according to the equations:

$$x = f \cdot \tan(\phi) \quad y - y_0 = f \cdot (h - h_0) \cdot \sec(\phi),$$

where $y_0$ and $h_0$ are determined by the vertical position of the horizontal line. In this way the user can take images in which the horizon is not at the image center, but which is still kept straight in the final mosaic.

Blocks 558 and 560 are optional. In one embodiment, the ability to determine the line of horizon is not performed. In other embodiments, the ability to determine the line of horizon is performed, but is performed by automatic detection rather than user input. These embodiments and others are within the scope and spirit of the invention.

After block 560, the process proceeds to block 562, where the user takes a first shot with the camera. The process proceeds to step 522, where a first image is captured based on the first shot taken from the camera. The process then advances to step 524, where at least the overlap portion of the captured image (in reduced resolution) is transformed to cylindrical coordinates in the manner discussed above. This overlap portion is the overlap in current image of the panorama and the next portion of the panorama. The process then moves to block 526, where the transformed overlap portion of the captured first image is saved.

Figure 6:
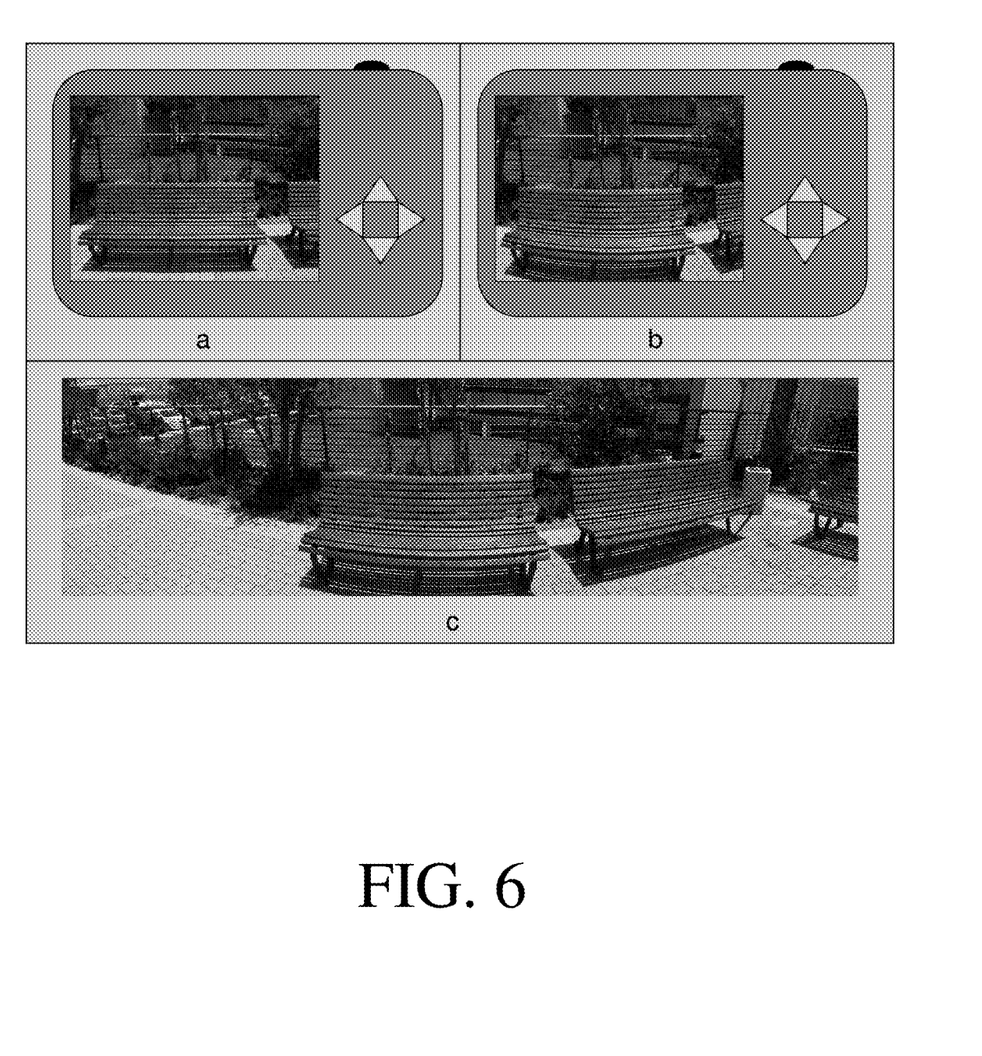
FIGS. 6a-c illustrates various additional camera images for illustrative purposes, in accordance with aspects of the present invention.

An example of the overlap between two images can be seen with reference to FIGS. 4*a*, 4*c*, and FIGS. 6*a*-*c*. FIG. 6*c* illustrates an example of how the final panorama mosaic will appear. By pointing the camera in the desired direction, the user receives a live preview of how the final panorama mosaic of FIG. 6*c* will appear. In this example, the panorama is left to right. As previously discussed, FIG. 4*b* is the first captured image, and FIG. 4*a* is the transformed first image. FIG. 6*a* shows the second image to be taken, and FIG. 4*b* shows the transformation of the second image. As can be seen, there is some overlap, about 20% in this example, between the first image and the second image. From the first image, the leftmost part of the left bench can be seen in the right part of the image. However, the second image shows the left part of the left bench at the left part of the image. This illustrates the 20% overlap between the first image and the second image in this example. At block 526, it is the portion of overlap between the current captured image and the next image to be captured that is saved.

In some embodiments, the amount of overlap is predetermined, such as 20% of the field of view. In other embodiment, the amount of overlap is automatically determined after the first image is shot by the following algorithm: in the (projected) first frame, corner detection is performed. When composing the panorama mosaic, points in one image are matched to points in another image to align the images precisely. Point matching may be performed using various well known algorithms in the art. In many such algorithms, corners are points which are likely to give reliable point matches. The amount of overlap is selected (in pixel columns between the images) as the minimum W for which a region of width W on the image side contains at least C corners, where C is a predetermined threshold. In one embodiment, C has an order of magnitude of about 100. In other embodiments, other suitable values for C may be employed. Any suitable method of corner detection may be employed. For example, in one example embodiment, the corner detection method determines, for each pixel, whether, in the neighborhood of the pixel, about 25% of the pixel values are similar to the value of the pixel, and about 75% of the pixel values are significantly different than the value of the pixel—these conditions indicate a corner at the pixel location. However, this is just one example of a corner detection algorithm—any suitable corner direction algorithm known in the art of image processing may be employed. In some embodiments, there may be a maximum amount of overlap, such as 50%. In some of these embodiments, the user receives an error if the maximum amount of overlap does not contain a sufficient number of corners, or an indication that a panorama at this location is unlikely to be successful. In various embodiments, if there are not sufficient corners in the maximum amount of overlap, the camera may either give an error rather than continuing, may use the maximum amount of overlap (e.g., 50% in one embodiment), or may revert to the default amount of overlap (e.g., 20% in one embodiment).

The process then proceeds to block 530, where, on the display of the camera (e.g. display 106 of FIG. 1) is simultaneously displayed the overlap portion of the image saved at block 526 and the transformed live view. The overlap portion of the image saved at block 526 is displayed adjacently to the live view. The portion of the screen that shows the overlap portion of the saved image does not show the live view. For example, if the overlap is 20%, and the panorama is left to right, then the left 20% of the screen displays the overlap portion of the saved transformed first captured image, and the right 80% of the screen displays the transformed live view.

The process then moves to decision block 582, where a determination is made as to whether the live view is aligned with the previous image. It is sufficient for coarse alignment to be done for this determination—for example, alignment within 80 pixels is sufficient in one embodiment.

At this step, for each frame of the live view—an attempt to determine the precise alignment of the previous image and the live view frame is performed. A search is performed to find correspondences between the two (projected) images, which are locations in one image which match locations in the other image. In one embodiment a RANSAC (random sample concensus) algorithm is used for the estimation of the transformation from these correspondences.

In said embodiment, the transformation estimated is affine, which is given by:

$$x'=a_{11}x+a_{12}y+a_{13}\ y'=a_{21}x+a_{22}y+a_{23}$$

The RANSAC process may be used to determine if the images are roughly aligned or not; this is because, when the images are roughly aligned, there will be a significant amount of correspondences which are in agreement with the model. If Na is the number of agreeing correspondences, and Nc is the total number of correspondences, than the model is reliable if Na/Nc>θ1, for some predefined threshold θ1.

Once it is determined that the model is reliable, we treat the affine transformation we have estimated as pure translation and rotation.

$$x'=x\cos\alpha+y\sin\alpha+t_x\ y'=-x\sin\alpha+y\cos\alpha+t_y,$$

Where $t_x$ and $t_y$ are the underlying translation parameters in the horizontal and vertical directions respectively, and α is the underlying rotation angle.

The relative correspondences between the images are denoted herein as Δx(i) and Δy(i), where i ranges over all the correspondences which fit the model.

$$\Delta x(i)=x'(i)-x(i)\ \Delta y(i)=y'(i)-y(i)$$

The average absolute displacement (AAD) between the images is given by:

$$AAD = \frac{1}{Na}\sum_i |\Delta x(i)| + |\Delta y(i)|$$

If AAD is smaller than some threshold θ2 (and Na/Nc>θ1, as previously discussed), then the determination at step 582 is positive. The two overlap regions are ideally identical, and therefore AAD, the absolute average displacement of all correspondences between the overlap region saved from the previous image and the overlap region in the live image, would ideally be zero. If AAD is smaller than threshold θ2 (and Na/Nc>θ1), then the images are roughly aligned.

The determination at step 582 is done in real time, and no tracking or pixel-based comparisons between the two images are performed. Also, unlike tracking applications, the user can move the camera at any speed, can hide the lens, or even lower the camera between shots and the indication at step 582 will still be valid.

If the determination at decision block 582, the process advances to block 588. However, if the determination at decision block 582 is negative, the process proceeds to block 586, where the user is guided for alignment of the image.

In the case where the model fits but the AAD is still above the threshold, then at block 586, the model is used to indicate to the user in which direction to move the camera in order to align the images better. In some embodiments, this may be done by evaluating the average horizontal displacement (AHD) and average vertical displacement (AVD):

$$AHD = \frac{1}{Na}\sum_i \Delta x(i)$$

$$AVD = \frac{1}{Na}\sum_i \Delta y(i)$$

If |AHD|+|AVD| is larger than some threshold θ3, than the user should pan the camera in the direction (AHD,AVD) in order to align the image; an indication of this is than displayed on the live view. If not, than the high AAD is not caused by displacement but by rotation. In this case the direction of rotation (clockwise or counter clockwise) can be estimated by observing the sign of the affine coefficient a12, which should correspond to sin(α); in some embodiments, an indication is displayed on the live view indicating that the user should rotate the camera in the determined direction. Block 586 is an optional step that is not performed in some embodiments.

The process then moves to decision block 582, where a determination is made as to whether the images are now aligned.

If the determination at decision block 582 is positive, the process advances to block 588, where an indication is made to the user that the images are coarsely aligned. For example, in some embodiments, the indication is made to the user in the live view by sound or visual indication or both that the next image may be captured. In another embodiment, the camera is instructed to automatically capture the next shot without user intervention.

The process then proceeds to block 590, where the user takes the next shot. The process then moves to block 592, where the next image is captured based on the shot taken from the camera at block 592. The process then advances to decision block 594, where a determination is made as to whether there are more images that need to be captured for the entire panorama mosaic. If so, the process moves to block 524, where the overlap portion of the current image (the one captured at block 592), is transformed to cylindrical coordinates.

However, if the determination at block 594 is negative, the process proceeds to block 596, where panorama stitching is performed to generate the entire panorama mosaic from each of the captured images. Any suitable method of panorama stitching may be employed. The panoramic stitching is enhanced as a result of assistance in coarsely aligning the images provided by method 520, resulting in better alignment. The process then moves to a return block, where other processing is employed.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for panorama stitching of images of a scene, comprising:
    capturing each pixel for a real-time view, wherein each real-time pixel corresponds to a particular pair of a plurality of rectangular coordinates;
    transforming each pair of rectangular coordinates that corresponds to each pixel of the real-time view into a particular pair of a plurality of cylindrical coordinates, wherein each transformed pair of cylindrical coordinates corresponds to each pixel in another real-time view of the scene and wherein the transforming is performed with respect to a line of horizon of the rectangular coordinates that determines the origin of the cylindrical coordinates;
    enabling a user to adjust a vertical position of the line of horizon for the real time view;
    adjusting each transformed pair of cylindrical coordinates if the vertical position of the line of horizon for the real time view is adjusted by the user;
    displaying the other real-time view that corresponds to the pairs of cylindrical coordinates;

capturing each pixel for a first image of the scene, wherein each pixel of the first image corresponds to a particular pair of the plurality of rectangular coordinates;

based on the adjusted vertical position of the line of horizon, transforming each pair of rectangular coordinates for each pixel in at least a portion of the first image into a particular pair of cylindrical coordinates, wherein the portion of the first image with a transformed pair of cylindrical coordinates for each pixel is saved; and displaying simultaneously the portion of the transformed first image and the other real-time view based on the transformed pairs of cylindrical coordinates to enable the user to align the portion of the transformed first image with the other real-time view.

2. The method of claim 1, wherein transforming each pair of rectangular coordinates that correspond to each pixel of the real-time view into a particular pair of a plurality of cylindrical coordinates includes:

for each of the plurality of cylindrical coordinates, determining correspondence with each real-time pixel in the rectangular coordinates based on interpolation by looking up each cylindrical coordinate in a look-up table and employing an interpolation device to perform interpolation to determine a corresponding coordinate in the rectangular coordinate system.

3. The method of claim 1, wherein transforming each pair of rectangular coordinates for each pixel in at least a portion of the first image into a particular pair of cylindrical coordinates includes:

for each of the cylindrical coordinates in the portion of the first transformed image, determining correspondence with each pair of rectangular coordinates for each pixel in the portion of the first image by looking up each cylindrical coordinate in a look-up table and employing an interpolation device to perform interpolation to determine a corresponding coordinate in the rectangular coordinate system.

4. The method of claim 1, further comprising:
making a determination as to whether the other real-time view is aligned with the portion of the transformed first image; and
if it is determined that the other real-time view is roughly aligned with the portion of the transformed first image, either automatically taking a shot or providing an indication to take the shot.

5. The method of claim 1, further comprising:
capturing each pixel for a second image of the scene, wherein each pixel of the second image corresponds to a particular pair of the plurality of rectangular coordinates;
transforming each pair of rectangular coordinates for each pixel in at least a portion of the second image into a particular pair of cylindrical coordinates, wherein the portion of the second image with a transformed pair of cylindrical coordinates for each pixel is saved; and
displaying simultaneously the portion of the transformed second image and the other real-time view based on the transformed pairs of cylindrical coordinates to enable alignment of the portion of the transformed second image with the other real-time view.

6. The method of claim 5, further comprising:
performing panoramic stitching to generate a panoramic mosaic based on at least the first image and the second image.

7. The method of claim 1, further comprising:
making a determination as to whether the other real-time view is aligned with the portion of the transformed first image; and
if it is determined that the other real-time view is aligned with the portion of the transformed first image, providing an indication to take a shot.

8. The method of claim 7, further comprising:
if it is determined that the other real-time view is unaligned with the portion of the transformed first image, providing an indication as to how to move a camera to align the other real-time view with the portion of the transformed first image.

9. The method of claim 7, wherein making the determination includes:
employing a random sample consensus algorithm to determine how many correspondences exist between an overlap region of the portion of the first transformed image and an overlap region of the other real-time view;
making a determination as to whether the number of correspondences is greater than a first predetermined threshold;
calculating an average absolute displacement between pixel values of the overlap region of the portion of the first transformed image and the overlap region of the other real-time view;
making a determination as to whether the average absolute displacement is less than a second predetermined threshold; and
if the number of correspondences is greater than the first predetermined threshold and the average absolute displacement is less than the second predetermined threshold, making a positive determination that the other real-time view is roughly aligned with the portion of the first transformed image.

10. The method of claim 9, wherein
the overlap region is a predetermined percentage of the transformed first image.

11. The method of claim 9, further comprising:
determining how much of the transformed first image to use as the overlap region, by determining a minimum width for which a region of the minimum width contains a predetermined number of corners.

12. A device for panorama stitching of images of a scene, comprising:
an image capture device that is arranged to capture an image; and
a processor that is configured to enable actions, including:
controlling the image capture device to capture each pixel for a real-time view, wherein each real-time pixel corresponds to a particular pair of a plurality of rectangular coordinates;
transforming each pair of rectangular coordinates that correspond to each pixel of the real-time view into a particular pair of a plurality of cylindrical coordinates, wherein each transformed pair of cylindrical coordinates corresponds to each pixel in another real-time view of the scene and wherein the transforming is performed with respect to a line of horizon of the rectangular coordinates that determines the origin of the cylindrical coordinates;
enabling a user to adjust a vertical position of the line of horizon for the real time view;
adjusting each transformed pair of cylindrical coordinates if the vertical position of the line of horizon for the real time view is adjusted by the user;

controlling display of the other real-time view that corresponds to the pairs of cylindrical coordinates;
controlling the image capture device to capture each pixel for a first image of the scene, wherein each pixel of the first image corresponds to a particular pair of the plurality of rectangular coordinates;
based on the adjusted vertical position of the line of horizon, transforming each pair of rectangular coordinates for each pixel in at least a portion of the first image into a particular pair of cylindrical coordinates, wherein the portion of the first image with a transformed pair of cylindrical coordinates for each pixel is saved; and
controlling simultaneous display of the portion of the transformed first image and the other real-time view based on the transformed pairs of cylindrical coordinates to enable alignment of the portion of the transformed first image with the other real-time view.

13. The device of claim 12, further comprising:
a look-up table; and
an interpolation device that is arranged to perform interpolation on values in the look-up table,
wherein the processor is arranged to enable transforming each pair of rectangular coordinates that correspond to each pixel of the real-time view into a particular pair of a plurality of cylindrical coordinates by controlling the interpolation device to:
look up each cylindrical coordinate in the look-up table and perform interpolation to determine a corresponding coordinate in the rectangular coordinate system.

14. The device of claim 12, further comprising:
a look-up table; and
an interpolation device that is arranged to perform interpolation on values in the look-up table,
wherein the processor is arranged to enable transforming each pair of rectangular coordinates for each pixel in at least the portion of the first image into a particular pair of cylindrical coordinates by controlling the interpolation device to:
look up each cylindrical coordinate in the look-up table and performing interpolation to determine a corresponding coordinate in the rectangular coordinate system.

15. The device of claim 12, wherein
the processor is configured to enable further actions, including:
controlling the image capture device to capture each pixel for a second image of the scene, wherein each pixel of the second image corresponds to a particular pair of the plurality of rectangular coordinates;
transforming each pair of rectangular coordinates for each pixel in at least a portion of the second image into a particular pair of cylindrical coordinates, wherein the portion of the second image with a transformed pair of cylindrical coordinates for each pixel is saved; and
controlling simultaneous display of the portion of the transformed second image and the other real-time view based on the transformed pairs of cylindrical coordinates to enable alignment of the portion of the transformed second image with the other real-time view.

16. The device of claim 12, wherein
the processor is configured to perform further actions, including:
making a determination as to whether the other real-time view is aligned with the portion of the transformed first image; and
if it is determined that the other real-time view is aligned with the portion of the transformed first image, providing an indication to take a shot.

17. The device of claim 16, wherein
the processor is configured to perform further actions, including:
if it is determined that the other real-time view is unaligned with the portion of the transformed first image, providing an indication as to how to move the image capture device to align the other real-time view with the portion of the transformed first image.

18. The device of claim 16, wherein
the processor is configured to make the determination such that making the determination includes:
employing a random sample consensus algorithm to determine how many correspondences exist between an overlap region of the portion of the first transformed image and an overlap region of the other real-time view;
making a determination as to whether the number of correspondences is greater than a first predetermined threshold;
calculating an average absolute displacement between pixel values of the overlap region of the portion of the first transformed image and the overlap region of the other real-time view;
making a determination as to whether the average absolute displacement is less than a second predetermined threshold; and
if the number of correspondences is greater than the first predetermined threshold and the average absolute displacement is less than the second predetermined threshold, making a positive determination that the other real-time view is roughly aligned with the portion of the first transformed image.

19. An article of manufacture including a processor-readable storage medium having processor-executable code encoded therein, which when executed by one or more processors, enables actions for panorama stitching of images of a scene, comprising:
capturing each pixel for a real-time view, wherein each real-time pixel corresponds to a particular pair of a plurality of rectangular coordinates;
transforming each pair of rectangular coordinates that correspond to each pixel of the real-time view into a particular pair of a plurality of cylindrical coordinates, wherein each transformed pair of cylindrical coordinates corresponds to each pixel in another real-time view of the scene and wherein the transforming is performed with respect to a line of horizon of the rectangular coordinates that determines the origin of the cylindrical coordinates;
enabling a user to adjust a vertical position of the line of horizon for the real time view;
adjusting each transformed pair of cylindrical coordinates if the vertical position of the line of horizon for the real time view is adjusted by the user;
displaying the other real-time view that corresponds to the pairs of cylindrical coordinates;
capturing each pixel for a first image of the scene, wherein each pixel of the first image corresponds to a particular pair of the plurality of rectangular coordinates;
based on the adjusted vertical position of the line of horizon, transforming each pair of rectangular coordinates for each pixel in at least a portion of the first image into a particular pair of cylindrical coordinates, wherein the portion of the first image with a transformed pair of cylindrical coordinates for each pixel is saved; and displaying simultaneously the portion of the transformed first image and the other real-time view based on the transformed pairs of cylindrical coordinates to enable a user to align the portion of the transformed first image with the other real-time view.

20. The article of manufacture of claim 19, wherein the processor-readable code enables transforming each pair of rectangular coordinates that correspond to each pixel of the real-time view into a particular pair of a plurality of cylindrical coordinates by controlling an interpolation device to look up each cylindrical coordinate in the look-up table and perform interpolation to determine a corresponding coordinate in the rectangular coordinate system.

\* \* \* \* \*